March 16, 1937. M. SPENGLER 2,074,282

PISTON

Filed Aug. 27, 1934

Inventor:
Max Spengler
By B. Singer, atty.

Patented Mar. 16, 1937

2,074,282

UNITED STATES PATENT OFFICE 2,074,282

PISTON

Max Spengler, Zurich, Switzerland

Application August 27, 1934, Serial No. 741,675
In Switzerland August 31, 1933

1 Claim. (Cl. 309—10)

This invention relates to certain improvements in pistons particularly adapted for use in internal combustion engines.

In the use of combustion engines, the efficiency of the engine depends to a considerable extent upon the perfect fit of the piston in the cylinder.

Pistons of cast iron running in cylinders made of cast iron, give satisfaction, the pistons being formed of the same material or at least a material of substantially the same coefficient of expansion as the material of which the cylinder is formed, so that the clearance between the piston and the cylinder will remain practically uniform at all temperatures.

However, cast iron and other suitable material of like coefficient of expansion have some other well known drawbacks.

To avoid these drawbacks, pistons have recently been formed of material having a high heat conductivity such as aluminum alloy. The difficulty with pistons of this character lies in the fact that aluminum alloys have with high heat conductivity also a high coefficient of expansion.

From the use, therefore, of aluminum alloys in the formation of pistons, the piston must be of materially less diameter than the cylinder when cold permitting considerable clearance and resulting in what is generally called "piston clatter or piston slaps" or if the clearance is small, the piston and cylinder will seize when hot.

The object of the invention is to produce a piston of aluminum alloys which will fit the cylinders with no, or with extremely little, clearance at any temperature, said piston having a skirt which will be somewhat resilient throughout its entire length and which on being inserted in the cylinder assumes substantially the shape of the cylinder bore.

A further object of my invention is to provide a piston having a skirt which will retain its true shape at any temperature and under any stress.

With these and other objects in view the invention consists in the construction and combination of parts shown in the drawing and hereinafter described and pointed out in the appended claim.

Figure 1:
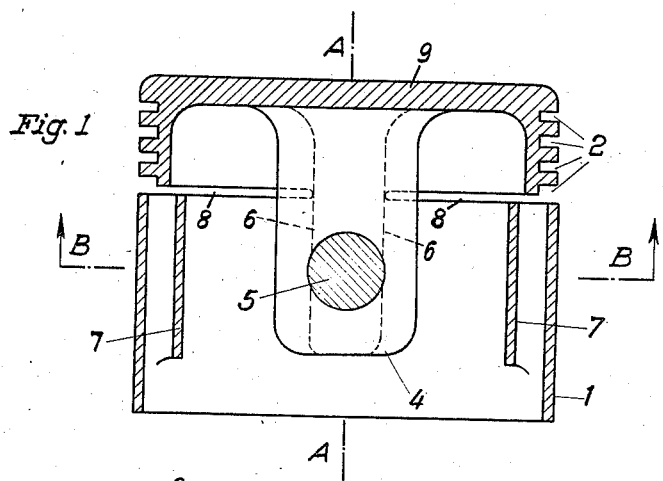
Fig. 1 is a sectional elevational view of a piston made in accordance with my invention.
Figure 2:
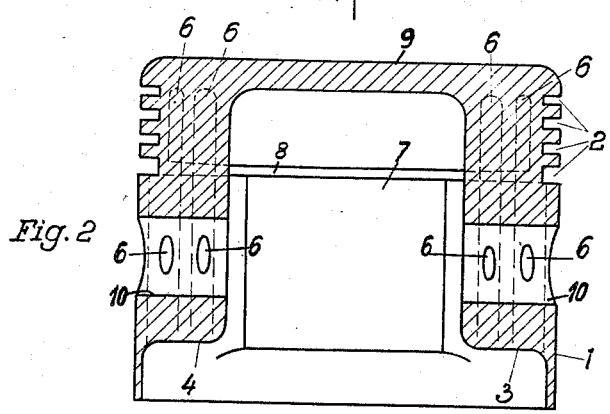
Fig. 2 is a sectional view on line A—A of Fig. 1.
Figure 3:
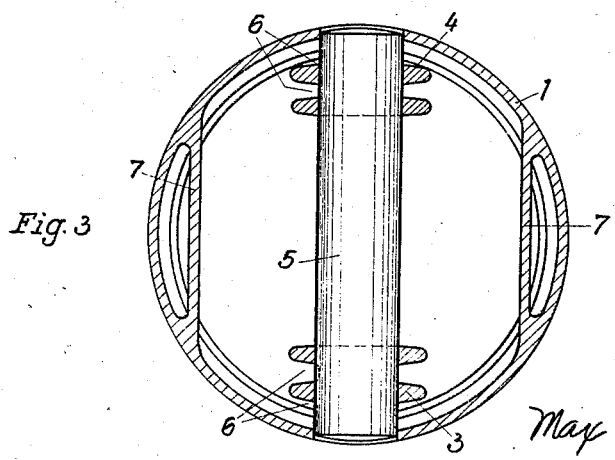
Fig. 3 is a cross-sectional view on line B—B of Fig. 1.

In the drawing 1 denotes the skirt of the piston, 3, and 4 the bearings for the piston pin 5. The head 9 of the piston is provided with grooves 2 adapted to receive the piston rings. In each side wall of the bearings 3, 4 two grooves 6 are arranged running parallel to the axis of the piston. The grooves 6 are deep enough to cut through the bores 10 of the bearings 3, 4. By the grooves 6 oil has access to the bores of the piston pin bearings. The head 9 and skirt 1 are partially separated from each other on both sides of the piston pin 5 by horizontal slots 8. Two webs or braces 7 extend from one side of the skirt to the other; they are parallel with the piston pin 5. The braces 7 serve to stiffen and strengthen the skirt and to secure the perfect cylindrical shape of the skirt even under high degrees of heat generated at high speed.

The piston fits the cylinder closely, the clearance being extremely small and constant at any temperature.

The braces 7 form part of the skirt 1 of the piston; they consist of the same alloy as the piston. While the braces 7 secure a true cylindrical shape they leave the skirt sufficiently resilient or flexible throughout its entire length or height to accommodate itself to the minute variations from a true cylinder which are always found in the cylinders of an engine. The braces 7 extend nearly over the full length of the skirt. The purpose of the invention is in all cases to provide a skirt, which will remain practically as constant in diameter as the cylinder within which the piston is to work, or be so constructed that the contraction and expansion of the skirt due to the variation in temperature will follow the contraction and expansion of the cylinder as closely as possible and thus maintain a uniform fit between the parts and avoid the piston slap and other troubles consequent upon a variation in clearance between these parts such as have commonly been experienced.

The clearance may be for instance with a piston of 100 mm. diameter, when cold, but 0.02 mm. The skirt may be of slightly smaller diameter in the direction of the axis of the pin 5. The bearing parts of the wall of the piston skirt are comparatively thin.

The skirt 1 may be provided in the well known manner with such slots which facilitate the expansion of the skirt, at high temperature. Experience shows that the expansion of the piston is most noticeable in the direction of the piston pin, the heat and therefore the expansion being transmitted by the bearings 3, 4 etc. The horizontal slots 8 separating the main portion of the skirt from the piston head serve to insulate said skirt from said head and guard the skirt against the excessive contraction and expansion that would result if the skirt at these points was directly connected with said head. Said slots 8 thus divide the upper portions of the bearing sides of the skirt from the piston head, and as the lower or extreme outer portion of the skirt is but slightly affected by the heat from the piston head, a skirt is formed adapted to be substantially constant in its diameter.

What I claim is:—

A light metal piston comprising a head and a skirt spaced from the head, said head and skirt having integral vertical rib-portions uniting the head and skirt at diametrically opposite sides and bored to provide piston pin bearings, vertical braces located in the skirt at each side of the piston pin location with their ends united to the piston wall, said braces being spaced from the wall of the skirt and arranged as chords of the circle of the skirt, and extending mainly above the level of the piston pin.

MAX SPENGLER.